(12) United States Patent
Li et al.

(10) Patent No.: US 9,009,741 B2
(45) Date of Patent: Apr. 14, 2015

(54) MECHANISM TO INITIATE CALLS BETWEEN BROWSERS WITHOUT PREDEFINED CALL SIGNALING PROTOCOL

(71) Applicant: Futurewei Technologies, Inc., Plano, TX (US)

(72) Inventors: Li Li, Bridgewater, NJ (US); Wu Chou, Basking Ridge, NJ (US); Tao Cai, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 70 days.

(21) Appl. No.: 13/758,250

(22) Filed: Feb. 4, 2013

(65) Prior Publication Data

US 2014/0223453 A1 Aug. 7, 2014

(51) Int. Cl.
*G06F 9/54* (2006.01)

(52) U.S. Cl.
CPC ...................................... *G06F 9/547* (2013.01)

(58) Field of Classification Search
None
See application file for complete search history.

(56) References Cited

U.S. PATENT DOCUMENTS

| 6,505,233 | B1 * | 1/2003 | Hanson et al. ................. 709/204 |
| 6,658,476 | B1 * | 12/2003 | Van ............................... 709/230 |
| 2004/0097188 | A1 | 5/2004 | Tanimoto |
| 2005/0021626 | A1 | 1/2005 | Prajapat et al. |
| 2010/0094755 | A1 * | 4/2010 | Kloster ............................ 705/44 |
| 2011/0041141 | A1 * | 2/2011 | Harm et al. .................... 719/318 |
| 2011/0182282 | A1 | 7/2011 | Hsu et al. |
| 2011/0242996 | A1 * | 10/2011 | Zhu et al. ....................... 370/252 |
| 2012/0101907 | A1 * | 4/2012 | Dodda ......................... 705/14.73 |
| 2012/0178420 | A1 * | 7/2012 | Ould .............................. 455/411 |
| 2013/0275492 | A1 * | 10/2013 | Kaufman et al. ............. 709/203 |

FOREIGN PATENT DOCUMENTS

| CN | 1503548 A | 6/2004 |
| CN | 1774707 A | 5/2006 |
| CN | 102143140 A | 8/2011 |

OTHER PUBLICATIONS

Foreign Communication From A Counterpart Application, PCT Application No. PCT/CN2014/071871, International Search Report dated Apr. 30, 2014, 7 pages.
Foreign Communication From A Counterpart Application, PCT Application No. PCT/CN2014/071871, Written Opinions dated Apr. 30, 2014, 6 pages.

* cited by examiner

*Primary Examiner* — Tuan Dao
(74) *Attorney, Agent, or Firm* — Conley Rose, P.C.; Grant Rodolph; Brandt D. Howell

(57) ABSTRACT

An apparatus comprising a processor configured to receive an instruction to place a call to a remote user, load a communications application, wherein the communications application comprises an isolated security context, request a list of one or more supported communications protocols from a server, receive the list of one or more supported communications protocols from the server, select a protocol from the list of one or more supported communications protocols, load the selected communications protocol in the isolated security context, and initiate the call through the communications application with the remote server using the selected communications protocol.

15 Claims, 6 Drawing Sheets

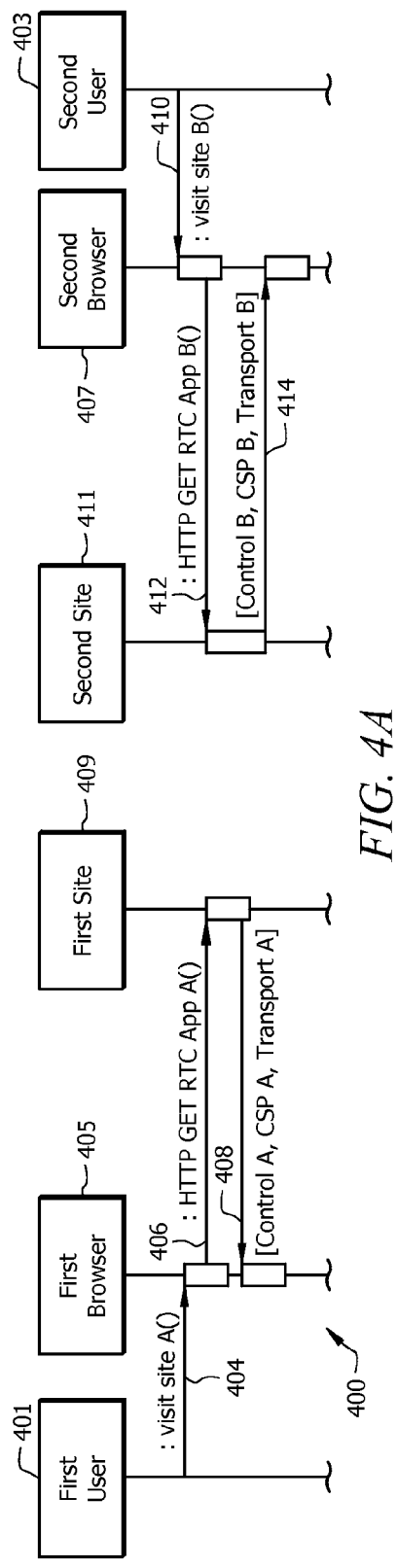
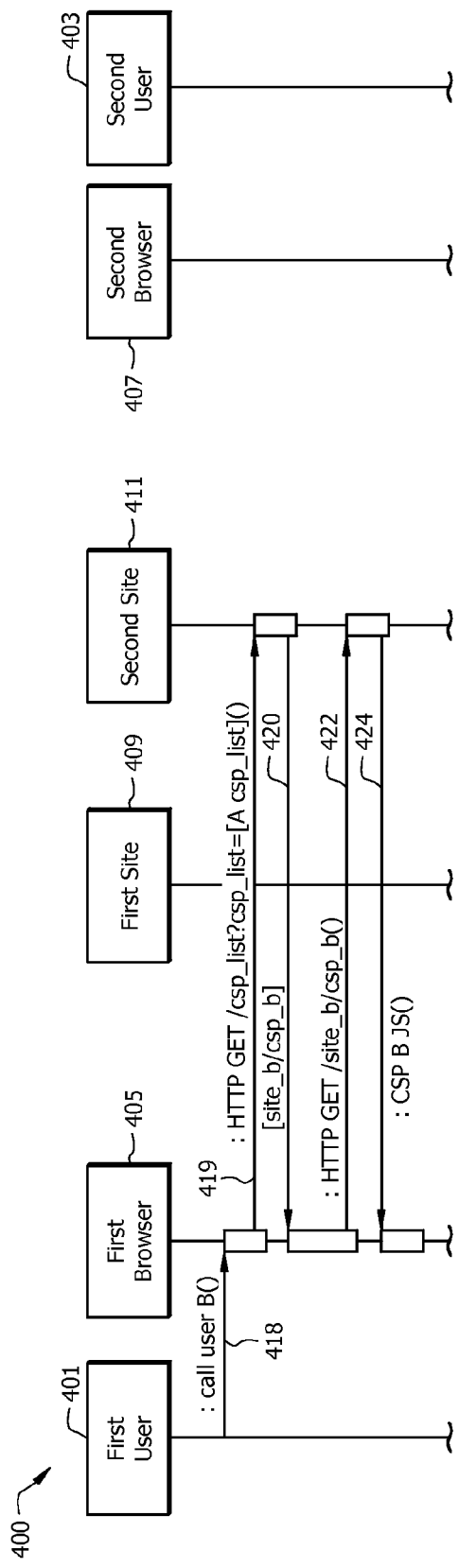
FIG. 4A
FIG. 4B

MECHANISM TO INITIATE CALLS BETWEEN BROWSERS WITHOUT PREDEFINED CALL SIGNALING PROTOCOL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multimedia calls and teleconferences, e.g., video calls, video chats, and Peer to Peer (P2P) file sharing sessions, using web applications, e.g., web browsers, are increasing in popularity. Web applications may initiate calls to each other based on World Wide Web Consortium (W3C) Web Real Time Communications (WebRTC) Application Programming Interfaces (APIs) using the same Call Signaling Protocol (CSP) without difficulty. However, a plurality of non-standardized CSP protocols exist and, consequently, some web applications may attempt WebRTC using conflicting CSPs, e.g., WebRTC Offer/Answer Protocol (ROAP), WebSocket (WS), Extensible Messaging and Presence Protocol (XMPP)/Jingle, Session Initiation Protocol (SIP), H.323, Media Gateway Control Protocol (MGCP), or CSPs specific to the communications web site. Conflicting CSPs typically results in an inability to engage in WebRTC communications.

As a result, applications with conflicting CSPs cannot initiate calls unless a previously agreed upon CSP is used for the call, which may be problematic in a number of circumstances. A WebRTC communications initiator ("caller") may generally ensure CSP interoperability by using a CSP provided by a WebRTC communications recipient ("callee") to call the callee. However, this may lead to phishing attacks in open web, since using a callee CSP may place the entire browser under the control of the callee web application and may render it difficult for the caller's web browser to enforce security norms. In a phishing context, a callee web application asks a caller to log into an XMPP server using the caller's Jabber Identifier (JID) and password. In a non-trustworthiness context, a government agency caller wants to alert a plurality of callees regarding an imminent natural disaster or other emergency. In such cases, the callees may be willing to use the CSP of the callers, but not vice versa.

Browser negotiation of CSPs using standard names, e.g., Uniform Resource Identifiers (URIs) or interface specifications, may not be desired for a variety of reasons. For example, standard names may not be desired because they require developing standard protocols, and developing standard protocols may take years to develop. Further, standard names may require extensive interoperability testing, namely, N×N pairwise coordinated number of tests, to verify functionality, and may ultimately only ensure interoperability to the extent of the tested cases. Consequently, an alternate solution may be preferred.

SUMMARY

In one aspect, the disclosure includes an apparatus comprising a processor configured to receive an instruction to place a call to a remote user, load a communications application, wherein the communications application comprises an isolated security context, request a list of one or more supported communications protocols from a server, receive the list of one or more supported communications protocols from the server, select a protocol from the list of one or more supported communications protocols, load the selected communications protocol in the isolated security context, and initiate the call through the communications application with the remote server using the selected communications protocol.

In another aspect, the disclosure includes a computer program product comprising computer executable instructions stored on a non-transitory medium that when executed by a processor cause the processor to perform the following load a communications application in a web browser, send a request for a supported communications protocol list to a site, receive the supported communications protocol list from the site, wherein the supported communications protocol list contains a communications protocol, send a request for a library supporting the communications protocol to the site, receive the library supporting the communications protocol from the site, send a communications offer encoded according to the communications protocol, and receive an answer encoded according to the communications protocol.

In yet another aspect, the disclosure includes a method for initiating calls between browsers without predefined CSPs, comprising implementing a CSP state machine at a first browser, requesting a CSP library for a CSP from a first server, receiving and loading the CSP library, sending an offer to a second server, wherein the offer is encoded according to the CSP, receiving an answer from the second server, wherein the answer is encoded according to the CSP, and transmitting data to a second browser according to the CSP, wherein the data comprises voice data, video data, or both.

These and other features will be more clearly understood from the following detailed description taken in conjunction with the accompanying drawings and claims.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 4A depicts what may be the initial conditions for an embodiment of a mechanism to initiate calls between sites without predefined CSPs.

FIG. 4B depicts what may be the CSP negotiation procedure used to initiate calls between sites without predefined CSPs.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosure describes systems and methods to guarantee the WebRTC applications from different sites use an interoperable CSP without the existence of any standard CSP. The disclosure describes such mechanisms and protocols to negotiate CSP JavaScript code and execute it in isolated security contexts such that interoperability is guaranteed with controlled security. Stated another way, the disclosure describes an architecture to separate a CSP layer, resource, or module from the rest of a WebRTC application, use the CSP layer, resource, or module to implement a CSP state machine in JavaScript, and sanction data transmissions between web applications. Using the disclosed systems and methods may provide, inter alia, reduced costs of interoperability tests, since only N independent tests are needed for N CSP implementations (rather than N×N pairwise coordinated tests, where N is a whole number); increased interoperability, since the applications may use identical CSP JavaScript code rather than different implementations of the same CSP; increased security through enforced and controlled mechanisms; and flexibility, since the modular design permits CSP code to be changed without impacting other parts of web applications.

Figure 1:
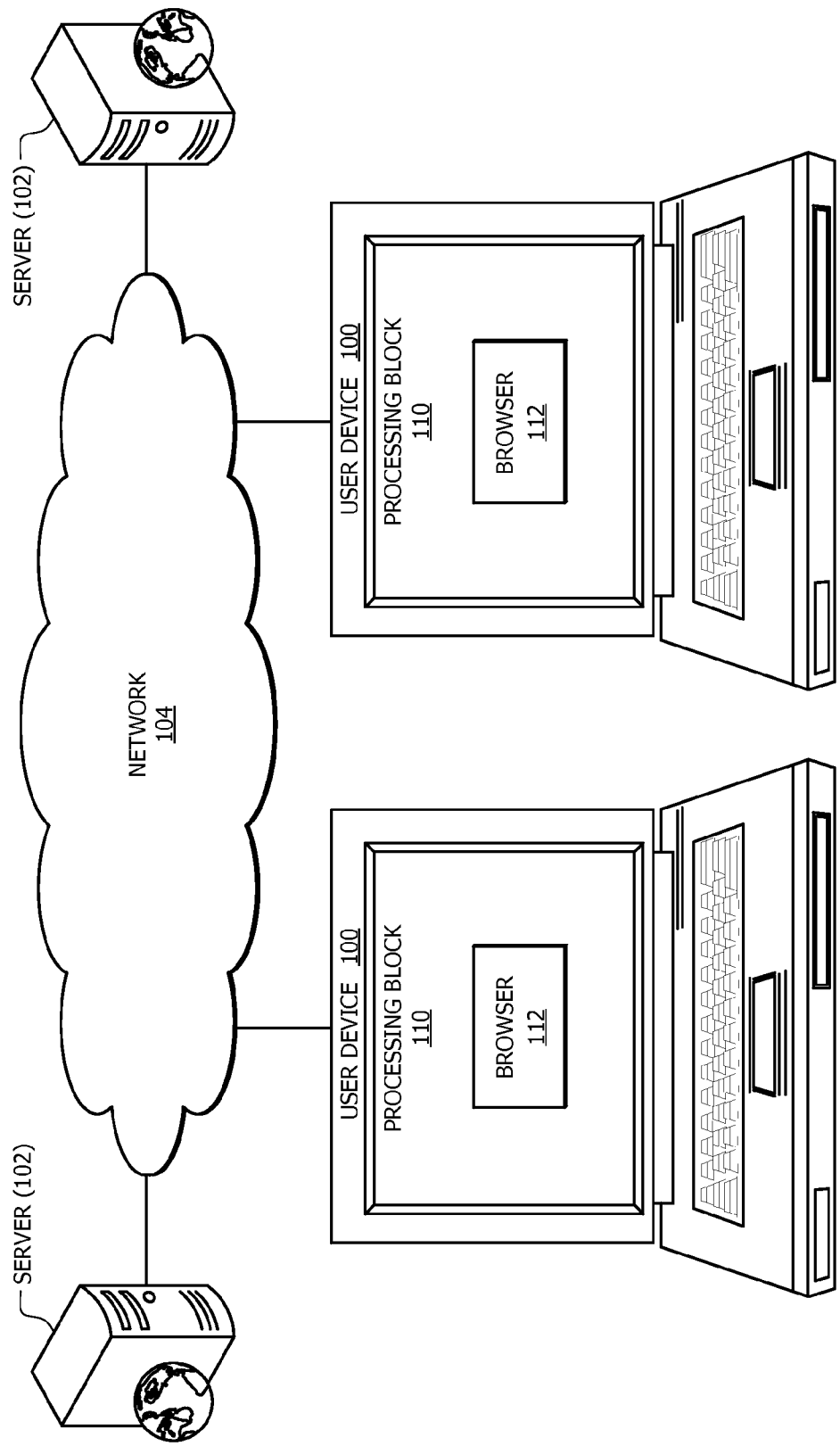
FIG. 1 illustrates an embodiment of a user device.

FIG. 1 illustrates an embodiment of a first and second user device 100. The user devices 100 may communicate with servers 102, e.g., by sending requests for and receiving HyperText Markup Language (HTML) documents containing URIs. The user devices 100 may be coupled to the servers 102 via a network 104, e.g., an Internet Protocol (IP) network, an Intranet, or any other network, such as a Local Area Network (LAN). The user devices 100 may separately be a fixed or mobile user-oriented device, e.g., a desktop computer, a notebook or laptop computer, a netbook computer, a tablet computer, a smart phone, a Personal Digital Assistant (PDA), or a cellular telephone. The user devices 100 may each comprise a processing block 110 and a browser or search application 112. The processing block 110 may be any software (e.g., operating system) and/or hardware that allows a user to configure or access the different features of the user devices 100 and to install and operate other software or programs on the user devices 100. The processing block 110 may include an operating system Windows®, Mac™ OS, and Android™. The browser/search application 112 may be a software or program that runs on the processing block 110 and allows the user to send search queries and receive search results on the user devices 100. The browser/search application 112 may communicate with the server via a first network (e.g., the Internet) using corresponding codes, APIs, languages, or interfaces. The browser/search application 112 may comprise a browser that may be used to access remotely a search application, e.g., via the Internet, or may comprise an integrated browser and search application. The browser/search application 112 may have a visual user interface for displaying search queries and results to the user. Examples of the browser/search application 112 may include Google Chrome™, Internet Explorer®, Mozilla Firefox®, and widgets. Although depicted in this embodiment as identical components, servers 102 and user devices 100 may be any suitable combination of components capable of accomplishing the designated purpose.

Figure 2:
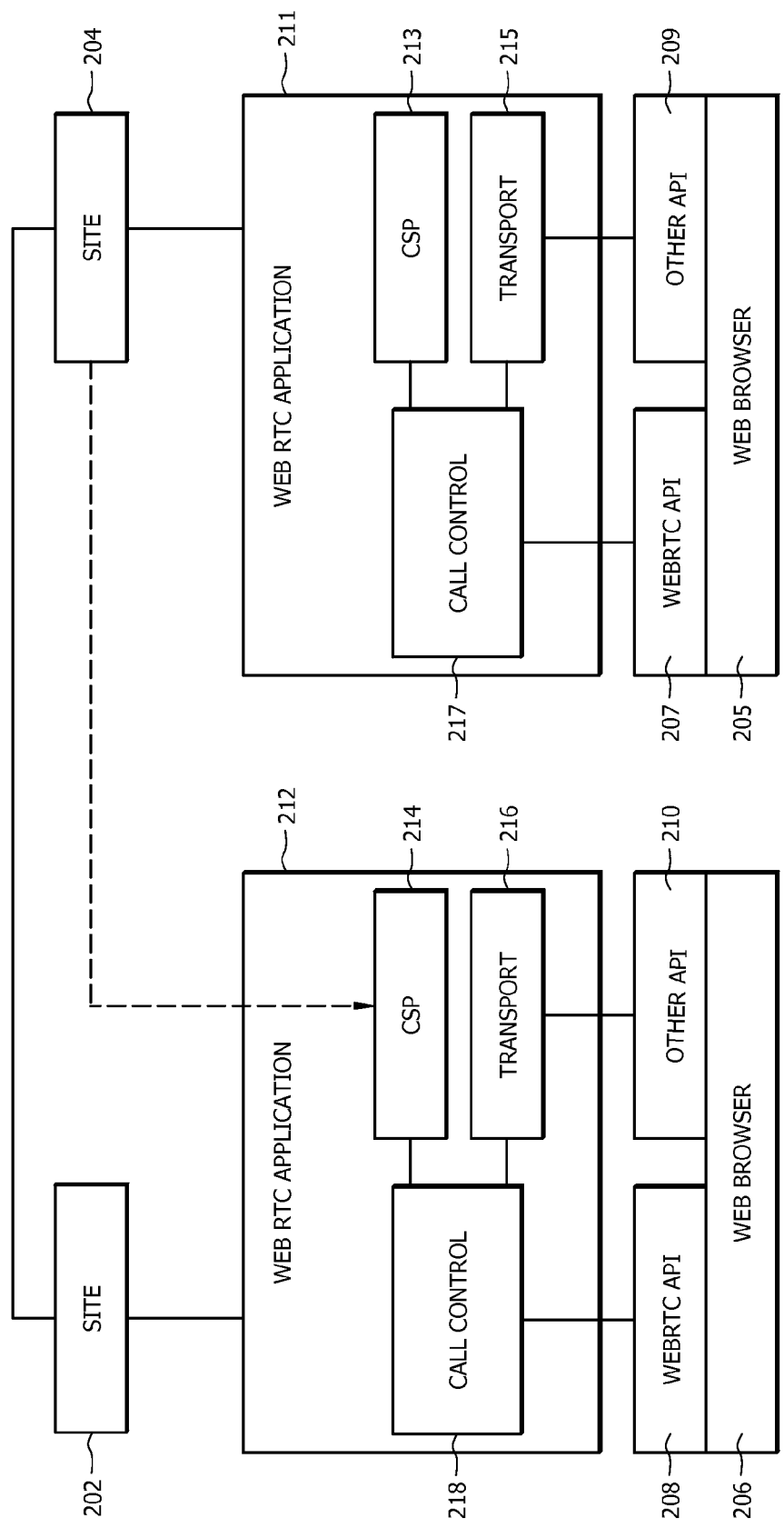
FIG. 2 is an example implementation of a mechanism to initiate calls between browsers without predefined CSPs.

FIG. 2 shows an example implementation of a mechanism to initiate calls between browsers without predefined CSPs. FIG. 2 contains site 202 and site 204, which may be any websites which offer communications services, e.g., WebRTC services to website users, e.g., as utilized by users' web browsers. Sites 202 and 204 may be separately hosted on separate servers, e.g., server 102 of FIG. 1. Site 202 may be the WebRTC service used by the caller and site 204 may be the WebRTC service used by the callee. FIG. 2 further contains a callee web browser 205 and a caller web browser 206, e.g., a communications application and/or browser/search application 112 of FIG. 1, comprising a callee WebRTC Application Programming Interface (API) 207 and another API 209, e.g., a W3C WebSocket JavaScript API, a Server-Sent Events API, an Asynchronous JavaScript and XML (AJAX) API, or other API for providing network services to support the transport JavaScript, etc., on one side and a caller WebRTC API 208 and another API 210 which may mirror the other API 209 on the other side. The callee computer, e.g., user device 100 of FIG. 1, may be equipped with a web browser 205, and the caller computer, e.g., user device 100 of FIG. 1, may be equipped with a web browser 206, and each web browser 205 and 206 may be the interface through which the callee and caller computers interact with sites 202 and 204. WebRTC applications 211 and 212 may be loaded onto web browsers 205 and 206, respectively. Callee WebRTC application 211 may comprise a CSP layer, resource, or module 213, a transport layer, resource, or module 215, and a call control layer, resource, or module 217. Caller WebRTC application 212 may comprise a CSP layer, resource, or module 214, a transport layer, resource, or module 216, and a call control layer, resource, or module 218. The CSP modules 213 and 214 may be configured to receive CSP libraries from sites 202 and 204 respectively, and configured to communicate with the call control modules 217 and 218. The transport modules 215 and 216 may be configured to communicate with the call control modules 217 and 218 and the other APIs 209 and 210 as depicted. The call control modules 217 and 218 may be configured to communicate with the CSP modules 213 and 214, the transport modules 215 and 216, and the WebRTC API 207 and 208, respectively. The WebRTC applications 211 and 212, and, consequently, the CSP modules 213 and 214, transport modules 215 and 216, and call control modules 217 and 218, may be implemented in JavaScript. The CSP modules 213 and 214 may define the portable state machines and message formats for the CSP, and may each comprise one or more libraries loaded from a peer site, e.g., site 204, during call initiation, as explained further under FIG. 3. The CSP modules 213 and 214 may each be run in an isolated security context, e.g., HyperText Markup Language 5 (HTML5) Inline Frame (iframe), within a web browser 205 or 206 on their host machines to prevent access to sensitive information, e.g., user passwords stored in the WebRTC applications 211 and 212. The transport modules 215 and 216 may regulate the flow of information and provide reliable transport to ensure that data arrives without error and in sequence, e.g., by providing a consistent bidirectional connection for the CSP. The call may control modules 213 and 214 may serve as a gatekeepers, may maintain calls, and may coordinate messages, e.g., HTML5 Web Messaging, WebIntent, and Cross-Origin Resource Sharing (CORS), between the WebRTC APIs 207 and 208, the CSP modules 213 and 214, and the transport modules 215 and 216, respectively.

Figure 3:
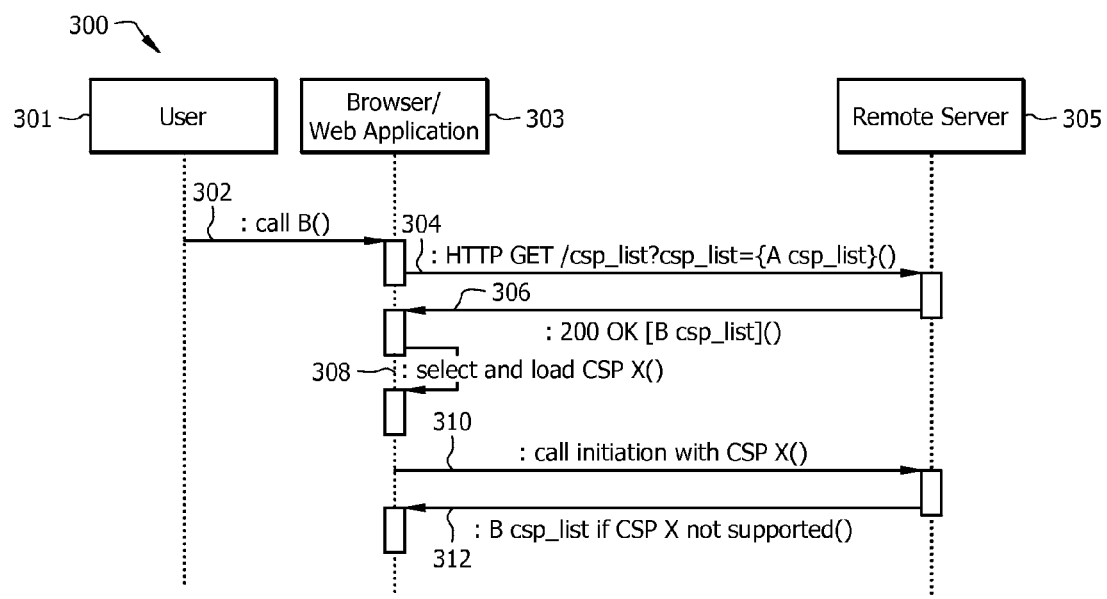
FIG. 3 is a protocol diagram showing a CSP negotiation procedure used by an embodiment of a mechanism to initiate calls between sites without predefined CSP.

FIG. 3 is a protocol diagram showing a CSP negotiation procedure 300 used by an embodiment of a mechanism to initiate calls between sites without predefined CSP. At step 302 a first user 301, e.g., user device 100 of FIG. 1, may issue or attempt to initiate a call to a second user (not shown), e.g., by pushing a button, at the browser 303, e.g., web browser 208 of FIG. 2, of the first user, thereby initiating a WebRTC application, e.g., WebRTC application 212 of FIG. 2. At step 304, the WebRTC application may send a request, e.g., a Hyper-Text Transfer Protocol (HTTP) get request, to a remote server 305, e.g., site 204 of FIG. 2, requesting the supported CSP library list from the remote server 305. At step 306, the remote server 305 may send a response containing a supported CSP library list. At 308, the browser/WebRTC application may select and load a CSP from the supported CSP library list transmitted by the remote server 305, e.g., via a CSP module 214 of FIG. 2 within an isolated security context. At step 310, the browser/WebRTC application may attempt to initiate a call with the second user via the remote site using the selected CSP. If the selected CSP is no longer supported by the remote site, at step 312 the remote site may send a response to the browser/WebRTC application that the CSP is not supported and may accompany the response with a new supported CSP library list. If a 'not supported' response is received, the browser/WebRTC application may iteratively repeat the process, e.g., beginning with step 304.

Figure 4C:
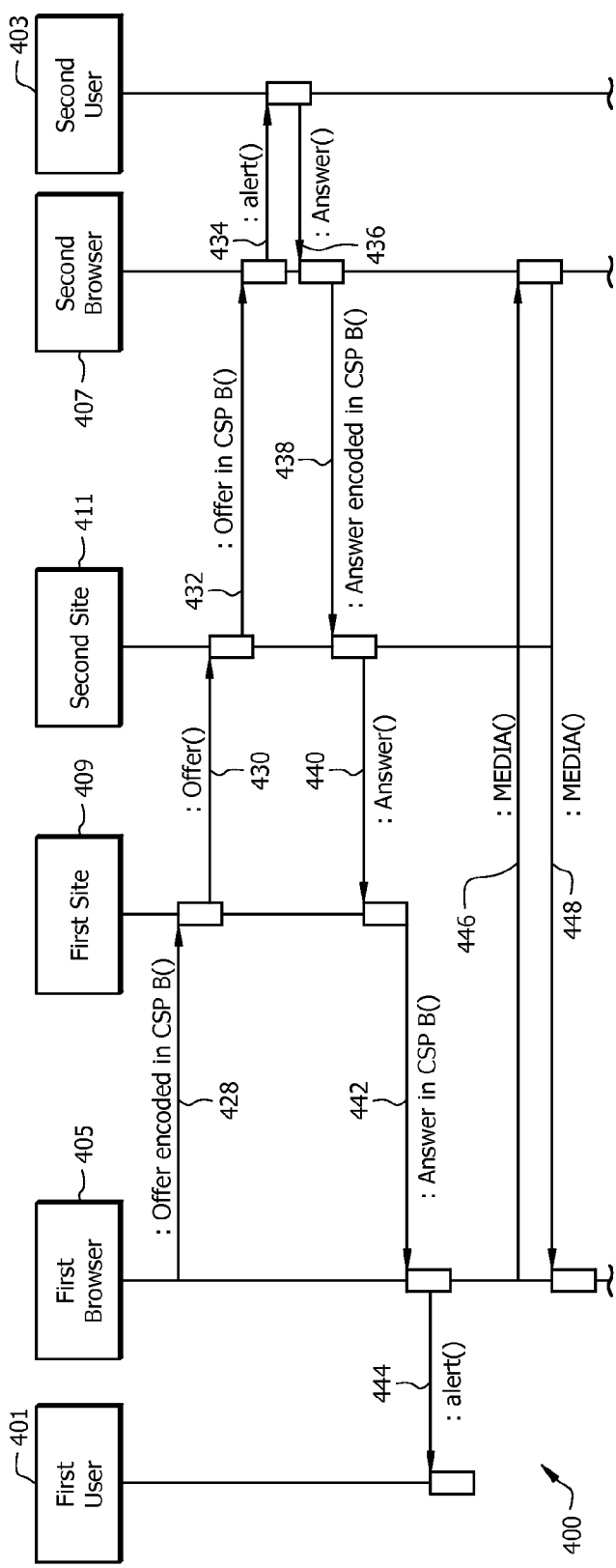
FIG. 4C depicts placing a call following use of an embodiment of a mechanism to initiate calls between sites without predefined CSPs.

FIGS. 4A, 4B and 4C are protocol diagrams showing different steps or phases of an initiation procedure used by an embodiment of a mechanism to initiate calls between sites without predefined CSP. Acceptable resolution/presence systems used for a first browser finding a second site are well known and, consequently, are not discussed herein for brevity. FIG. 4A depicts what may be the initial conditions for the system, namely, two users 401 and 403 at devices, e.g., user device(s) 100 of FIG. 1, employ browsers 405 and 407, e.g., web browsers 205 and 206, to go to WebRTC sites 409 and 411, e.g., sites 202 and 204 of FIG. 2, and the WebRTC sites 409 and 411 provide the browsers 405 and 407 with CSP libraries. More specifically, at step 404 a first user 401 uses a first browser 405, visits a first site 409, e.g., a WebRTC site, and sends a request for a first communication protocol, e.g., an HTTP get request, at step 406. At step 408, the first browser 405 may receive the requested protocol, e.g., a first CSP, from the first site 409. At 410, a second user 403 uses a second browser 407 to visit a second site 411, e.g., a WebRTC site, and sends a request for a second communication protocol, e.g., an HTTP get request, at step 412. At step 414, the second browser 407 may receive the requested protocol, e.g., a second CSP, from the second site 411. The first and second CSPs may conflict. This set of initial conditions may immediately precede the remainder of procedure or may include an intervening time. Further, steps 404-408 on the one hand and steps 410-412 on the other may occur separately or simultaneously.

FIG. 4B depicts what may be the CSP negotiation procedure used to initiate calls between sites without predefined CSPs, e.g., procedure 300 of FIG. 3. Thus, at step 418 the first caller may elect to place a call to the second user 403, e.g., through a WebRTC call, causing a first browser 405 may send a request, e.g., an HTTP get request, to the second site 411 requesting the supported CSP library list from the second site 411 at step 419. At step 420, the second site 411 may send a response to the first site 409 containing a supported CSP library list. At step 422, the first site 409 may select a CSP from the retrieved list, may inform the second site 411 of the selection, and may receive and load the selected CSP library from the second site 411 at step 424.

FIG. 4C depicts a call from the first user 401 to the second user 403 using a conventional WebRTC ROAP, and may begin with an offer encoded according to the selected CSP at step 428, which may then pass from the first browser 405 to the first site 409. At step 430, the first site 409 may pass the offer to the second site 411, which in turn may relay the offer encoded according to the selected CSP to the second browser 407 at 432. The second browser 407 may alert the second user 403 at step 434, e.g., through an audible ring, a visual alert, etc., and at step 436 the second user 403 may answer the call using the second browser 407. The second browser 407 may encode the answer according to the selected CSP at step 438 and pass the answer to the second site 411. The second site 411 may send the answer back to the first site 409 at step 440, and the second site 411 may pass the CSP encoded answer to the first browser 405 at step 442. The first user 401 may receive a notification or alert from the first browser 405 that the second user 403 has answered the call at 444. Finally, at steps 446 and 448 the first and second users 401 and 403 may exchange data through their browsers.

Figure 5:
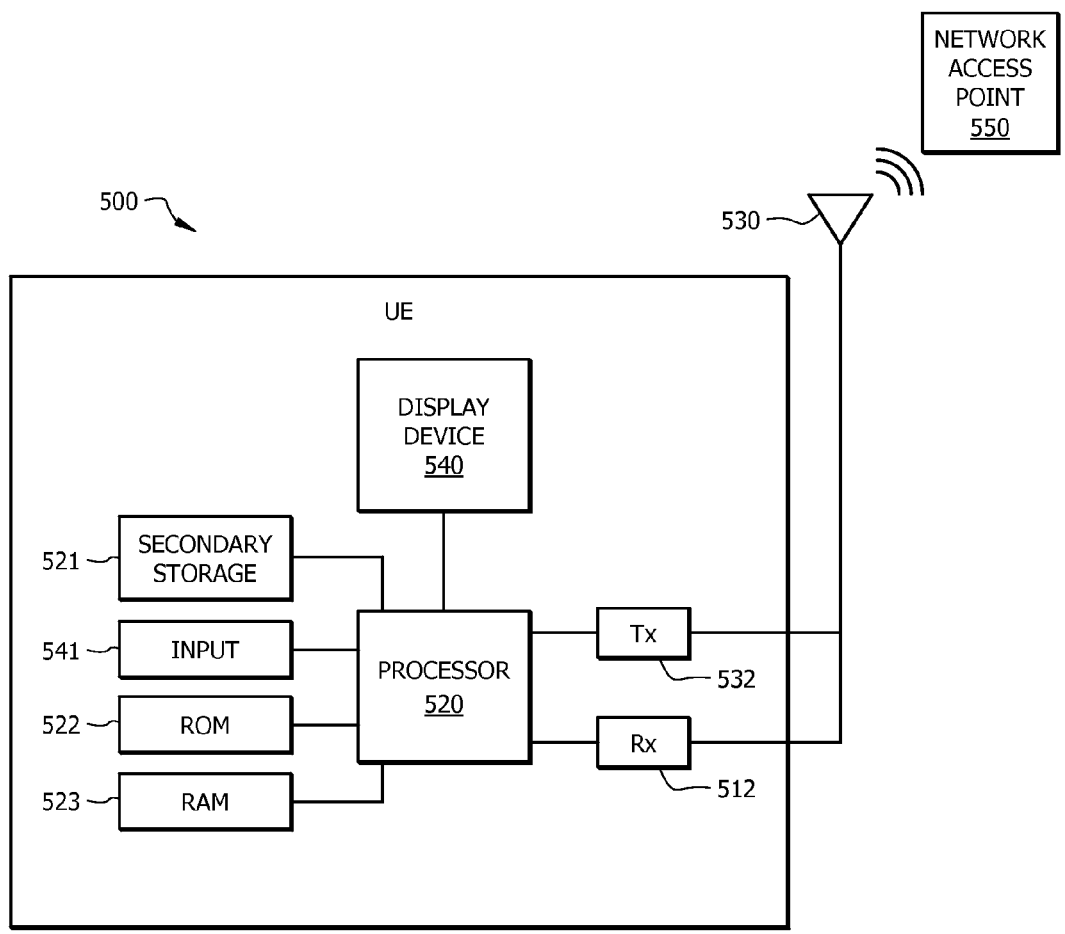
FIG. 5 is a schematic diagram of an embodiment of a communications device.

WebRTC capable devices, such video teleconferencing systems and/or other communications systems discussed herein, may operate in a telecommunications system and may be required to wirelessly transmit and receive multiple types of data substantially simultaneously. Communications devices, e.g., mobile smartphones, may be equipped with a plurality of antennas that may operate as transmitters and/or receivers (or transceivers) to transmit and receive data. The communications devices' antennas may wirelessly communicate with a network by transmitting and/or receiving data over specified frequencies. FIG. 5 is a schematic diagram of an embodiment of a communications device 500, e.g., a user device 100 of FIG. 1. Communications device 500 may comprise a two-way wireless communication device having voice and data communication capabilities. In some aspects, voice communication capabilities are optional. The communications device 500 generally has the capability to communicate with other computer systems on the Internet. Depending on the exact functionality provided, the communications device 500 may be referred to as a data messaging device, a cellular telephone, a wireless Internet appliance, a wireless device, a smart phone, a mobile device, and/or a data communication device, as example.

Communications device 500 may comprise a processor 520 (which may be referred to as a central processor unit or CPU) that is in communication with memory devices including secondary storage 521, read only memory (ROM) 522, and random access memory (RAM) 523. The processor 520 may be implemented as one or more CPU chips, one or more cores (e.g., a multi-core processor), or may be part of one or more Application Specific Integrated Circuits (ASICs) and/or Digital Signal Processors (DSPs). The processor 520 may be configured to implement any of the schemes described herein, and may be implemented using hardware, software, firmware, or combinations thereof.

The secondary storage 521 may be comprised of one or more solid state drives, disk drives, and/or other memory types and is used for non-volatile storage of data and as an over-flow data storage device if RAM 523 is not large enough to hold all working data. Secondary storage 521 may be used to store programs that are loaded into RAM 523 when such programs are selected for execution. The ROM 522 may be used to store instructions and perhaps data that are read during program execution. ROM 522 may be a non-volatile memory device may have a small memory capacity relative to the larger memory capacity of secondary storage 521. The RAM 523 may be used to store volatile data and perhaps to store instructions. Access to both ROM 522 and RAM 523 may be faster than to secondary storage 521.

The communications device 500 may communicate data (e.g., packets) wirelessly with a network via a network access point 550. As such, the communications device 500 may comprise a receiver (Rx) 512, which may be configured for receiving data (e.g. wireless packets or frames) from other components. The receiver 512 may be coupled to the processor 520, which may be configured to process the data and determine to which components the data is to be sent. The communications device 500 may also comprise a transmitter (Tx) 532 coupled to the processor 520 and configured for transmitting data to other components, for example by using protocols such as IEEE 802.11, IEEE 802.16, 3rd Generation Partnership Project (3GPP), Global System for Mobile Communications (GSM), or similar wireless protocols. The receiver 512 and transmitter 532 may be coupled to a plurality of antennas 530, which may be configured to receive and transmit wireless Radio Frequency (RF) signals. In some embodiments, Tx 532 and Rx 512 may be replaced by a transceiver comprising the functionality of both Tx 532 and Rx 512.

The communications device 500 may also comprise a display 540 coupled to the processor 520, that displays output thereof to a user. In some embodiments, display 540 is a display station remote from the communications device 500. The communications device 500 and the display 540 may be configured to display representations of data to a user. The device display 520 may comprise a Color Super Twisted Nematic (CSTN) display, a Thin Film Transistor (TFT) display, a Thin Film Diode (TFD) display, an Organic Light-Emitting Diode (OLED) display, an active-matrix OLED display, or any other display screen. The display 540 may display in color or monochrome and may be equipped with a touch sensor based on resistive and/or capacitive technologies.

The communications device 500 may further comprise an input device 541 coupled to the processor 520, which may allow the user to input commands to the communications device 500. In the case that the display device 540 comprises a touch sensor, the display device 540 may also be considered the input device 541. In addition to and/or in the alternative, an input device 541 may comprise a mouse, trackball, built-in keyboard, external keyboard, and/or any other device that a user may employ to interact with the communications device 500. In the context of multimedia communications, e.g., video teleconferencing, input device 541 may be a camera.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a receiver;
   a transmitter; and
   a processor coupled to the receiver and the transmitter and configured to cause the apparatus to:
   receive, via the receiver, an instruction to place a call to a remote user;
   load a communications application, wherein the communications application is configured to load a HyperText Markup Language (HTML) based Inline Frame (iframe) to act as an isolated security context;
   request, via the transmitter, a list of one or more supported communications protocols from a server;
   receive, via the receiver, the list of one or more supported communications protocols from the server;
   select a communication protocol from the list of one or more supported communications protocols;
   dynamically obtain from the server, via the receiver, a communication protocol library that provides signaling implementations for the communication protocol selected from the list received from the server;
   load the communication protocol library obtained from the server into the HTML based iframe to prevent remote user access to sensitive local data stored by the communications application; and
   initiate the call to the remote user through the communications application using the communication protocol library obtained dynamically from the server,
   wherein the signaling implementations provided by the communication protocol library comprise a portable state machine definition associated with the selected communications protocol, a message format definition associated with the selected communications protocol, or combinations thereof.

2. The apparatus of claim 1, wherein the processor is initially configured to cause the apparatus to communicate with the remote user using a first protocol, wherein the remote user employs a second protocol for communications, and wherein the selected communications protocol is the second protocol.

3. The apparatus of claim 1, wherein the communications application is implemented in JavaScript.

4. The apparatus of claim 3, wherein the communications application is a Web Real Time Communication (WebRTC) application.

5. The apparatus of claim 1, wherein the call is selected from a group consisting of: a video call, a video chat, and a Peer to Peer (P2P) file sharing session.

6. The apparatus of claim 1, wherein the processor is further configured to load the communications application into a browser operating on the apparatus.

7. The apparatus of claim 1, wherein the processor is further configured to dynamically obtain the communication protocol library from the server by:
receiving, via the receiver, a list of communication protocol libraries corresponding to the supported communications protocols from the server; and
selecting the communication protocol library that corresponds to the communication protocol selected from the list.

8. A method comprising:
receiving an instruction to place a call to a remote user;
loading a communications application, wherein the communications application is configured to load a HyperText Markup Language (HTML) based Inline Frame (iframe) to act as an isolated security context;
requesting a list of one or more supported communication protocol libraries from a server;
receiving the list of the one or more supported communication protocol libraries from the server;
selecting a communication protocol library from the list of the one or more supported communication protocol libraries;
dynamically obtaining from the server the communication protocol library selected from the list, wherein the selected communication protocol library comprises portable signaling state machine codes;
loading the selected communication protocol library obtained from the server into the HTML based iframe; and
initiating the call to the remote user through the communications application by executing the portable signaling state machine codes in the selected communication protocol library obtained dynamically from the server,
wherein the portable signaling state machine codes are executed in the HTML based iframe to prevent remote user access to sensitive local data stored by the communications application, and
wherein the selected communication protocol library obtained from the server further comprises a message format definition associated with the selected communications protocol library.

9. The method of claim 8, wherein the communications application is implemented in JavaScript.

10. The method of claim 8, wherein the communications application is a Web Real Time Communication (WebRTC) application.

11. The method of claim 8, wherein the communications application is loaded in a browser.

12. A computer program product comprising computer executable instructions stored on a non-transitory computer readable medium such that when executed by a processor cause the processor to:
receive an instruction to place a call to a remote user;
load a communications application, wherein the communications application is configured to load a HyperText Markup Language (HTML) based Inline Frame (iframe) to act as an isolated security context;
request a list of one or more supported communication protocol libraries from a server;
receive the list of the one or more supported communication protocol libraries from the server;
select a communication protocol library from the list of the one or more supported communication protocol libraries;
dynamically obtain from the server the communication protocol library selected from the list, wherein the selected communication protocol library comprises portable signaling state machine codes;
load the selected communication protocol library obtained from the server into the HTML based iframe; and
initiate the call to the remote user through the communications application by executing the portable signaling state machine codes in the selected communication protocol library obtained dynamically from the server,
wherein the portable signaling state machine codes are executed in the HTML based iframe to prevent remote user access to sensitive local data stored by the communications application, and
wherein the selected communication protocol library obtained dynamically from the server further comprises a message format definition associated with the selected communications protocol library.

13. The computer program product of claim 12, wherein the processor is initially configured to communicate with the remote user using a first protocol, wherein the remote user employs a second protocol for communications, and wherein the selected communications protocol is the second protocol.

14. The computer program product of claim 12, wherein the communications application is a Web Real Time Communication (WebRTC) application implemented in JavaScript, and wherein the selected communication protocol library obtained dynamically from the server is implemented in JavaScript.

15. The computer program product of claim 12, wherein the instructions further cause the processor to load the application is into a local browser.

* * * * *